US011952824B2

(12) United States Patent
Uebel et al.

(10) Patent No.: US 11,952,824 B2
(45) Date of Patent: Apr. 9, 2024

(54) SYSTEM AND METHOD FOR ADJUSTING A VEHICLE DOOR RELATIVE TO A VEHICLE BODY

(71) Applicant: Brose Fahrzeugteile SE & Co. Kommanditgesellschaft, Bamberg, Bamberg (DE)

(72) Inventors: Wolfgang Uebel, Weitramsdorf (DE); Christian Herrmann, Großheirath (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 0 days.

(21) Appl. No.: 18/104,671

(22) Filed: Feb. 1, 2023

(65) Prior Publication Data

US 2023/0175306 A1 Jun. 8, 2023

Related U.S. Application Data

(62) Division of application No. 17/011,895, filed on Sep. 3, 2020, now Pat. No. 11,591,841.

(30) Foreign Application Priority Data

Sep. 5, 2019 (DE) ..................... 10 2019 123 876.5

(51) Int. Cl.
*E05F 15/00* (2015.01)
*E05F 15/40* (2015.01)
(Continued)

(52) U.S. Cl.
CPC .............. *E05F 15/73* (2015.01); *E05F 15/40* (2015.01); *E05F 15/611* (2015.01); *E05F 15/77* (2015.01);
(Continued)

(58) Field of Classification Search
CPC ......... E05F 15/77; E05F 15/611; E05F 15/73; E05F 15/40; E05F 2015/767;
(Continued)

(56) References Cited

U.S. PATENT DOCUMENTS

| | | |
|---|---|---|
| 7,710,245 B2 | 5/2010 | Pickering |
| 9,051,769 B2 | 6/2015 | Washeleski et al. |

(Continued)

FOREIGN PATENT DOCUMENTS

| | | |
|---|---|---|
| DE | 102004062459 A1 | 4/2006 |
| DE | 102011010242 A1 | 8/2011 |

(Continued)

*Primary Examiner* — Chi Q Nguyen
(74) *Attorney, Agent, or Firm* — Dickinson Wright PLLC

(57) ABSTRACT

A system for adjusting a vehicle door relative to a vehicle body including an adjusting device, a control device for controlling the adjusting device. The control device is configured to receive an operating command and control the adjusting device based on receiving the operating command, and a sensor device for detecting an object. The control device is configured to evaluate for the purpose of collision protection monitoring whether an operating command is received in a near area relative to the vehicle door via an operating device. For collision protection monitoring, the control device is configured to use a first recognition area in a first operating mode upon receiving an operating command via an operating device in the near area, and in a second operating mode to use a second recognition area different from the first recognition area when an operating command is not received in the near area.

4 Claims, 6 Drawing Sheets

(51) Int. Cl.
*E05F 15/611* (2015.01)
*E05F 15/73* (2015.01)
*E05F 15/77* (2015.01)

(52) U.S. Cl.
CPC ... *E05F 2015/767* (2015.01); *E05Y 2201/408* (2013.01); *E05Y 2400/40* (2013.01); *E05Y 2400/54* (2013.01); *E05Y 2600/46* (2013.01); *E05Y 2900/532* (2013.01)

(58) Field of Classification Search
CPC ........... E05Y 2900/532; E05Y 2400/54; E05Y 2201/408; E05Y 2400/858; E05Y 2400/40; E05Y 2900/546; E05Y 2600/46
USPC ............................................................... 49/31
See application file for complete search history.

(56) References Cited

U.S. PATENT DOCUMENTS

| | | | | |
|---|---|---|---|---|
| 9,797,179 | B2 | 10/2017 | Washeleski et al. | |
| 11,660,985 | B2 * | 5/2023 | Kanitz | B60J 5/0479 49/366 |
| 2004/0124662 | A1 | 7/2004 | Cleland et al. | |
| 2009/0000196 | A1 | 1/2009 | Kollar et al. | |
| 2010/0287837 | A1 | 11/2010 | Wuerstlein et al. | |
| 2011/0313619 | A1 | 12/2011 | Washeleski et al. | |
| 2012/0123649 | A1 | 5/2012 | Eggers et al. | |
| 2012/0277958 | A1 * | 11/2012 | Trombke | E05F 15/70 701/48 |
| 2012/0285087 | A1 * | 11/2012 | Eggeling | E05B 81/14 49/506 |
| 2013/0311039 | A1 * | 11/2013 | Washeleski | E05F 15/46 701/36 |
| 2014/0000166 | A1 * | 1/2014 | Groewe | E05F 15/611 49/31 |
| 2014/0207344 | A1 * | 7/2014 | Ihlenburg | E05F 15/73 701/49 |
| 2015/0025751 | A1 | 1/2015 | Sugiura et al. | |
| 2015/0073666 | A1 | 3/2015 | Dotterweich et al. | |
| 2015/0361711 | A1 | 12/2015 | Baumann et al. | |
| 2017/0241182 | A1 * | 8/2017 | Hung | E05F 15/46 |
| 2017/0247926 | A1 * | 8/2017 | Elie | E05F 15/40 |
| 2017/0335615 | A1 | 11/2017 | Herrmann et al. | |
| 2019/0145150 | A1 * | 5/2019 | Kidena | G06N 20/00 701/49 |
| 2020/0165860 | A1 | 5/2020 | Gempel et al. | |
| 2020/0291708 | A1 * | 9/2020 | Kimura | E05F 15/40 |
| 2021/0087868 | A1 | 3/2021 | Washeleski et al. | |
| 2023/0160250 | A1 * | 5/2023 | Goodchild | E05F 15/40 49/28 |

FOREIGN PATENT DOCUMENTS

| | | | |
|---|---|---|---|
| DE | 102012014243 | B4 | 11/2015 |
| DE | 102015011976 | A1 | 3/2017 |
| EP | 3219563 | A1 | 9/2017 |
| EP | 1407106 | B2 | 3/2019 |
| FR | 2936997 | A1 | 4/2010 |
| WO | 2009000861 | A1 | 12/2008 |
| WO | 2016173579 | A1 | 11/2016 |
| WO | 2017169128 | A1 | 10/2017 |

* cited by examiner

SYSTEM AND METHOD FOR ADJUSTING A VEHICLE DOOR RELATIVE TO A VEHICLE BODY

CROSS-REFERENCE TO RELATED APPLICATIONS

This application is a Divisional of U.S. patent application Ser. No. 17/011,895, filed on Sep. 3, 2020, now U.S. Pat. No. 11,591,841 which claims the benefit of German Patent Application Serial No. DE 10 2019 123 876.5 filed Sep. 5, 2019, the disclosures of which are hereby incorporated in their entirety by reference herein.

TECHNICAL FIELD

This present disclosure relates to a system for adjusting a vehicle door relative to a vehicle body.

BACKGROUND

Vehicles may include a vehicle door, for example, a tailgate or a vehicle side door on a vehicle or another flap device pivotally arranged on the vehicle body such as an engine hood or a cover for a loading area.

A system for adjusting a vehicle door may include an electromotive adjusting device, a control device for controlling the adjusting device, and a sensor device for detecting an object. The control device is configured to receive an operating command and to control the adjusting device in dependence on the receipt of an operating command for adjusting the vehicle door.

SUMMARY

One or more objects of the present disclosure may be to provide a system and a method for adjusting a vehicle door relative to a vehicle body, that may provide for a reliable obstacle detection for the purpose of collision protection monitoring, while reducing the risk of an undesired influence of an adjusting operation by an object falsely recognized as an obstacle Accordingly, the control device is configured to evaluate whether an operating command is received via an operating device in a near area relative to the vehicle door for the purpose of collision protection monitoring. For collision monitoring, the control device in a first operating mode furthermore is configured to use a first recognition area, when an operating command is received via an operating device in the near area, in order to recognize an object detected by the sensor device in a first recognition area as a collision obstacle, and in a second operating mode, when an operating command is not received in the near area, to use a second recognition area different from the first recognition region in order to recognize an object detected by the sensor device in the second recognition area as a collision obstacle.

The control device may be designed to evaluate whether an operating command for adjusting the vehicle door is received in a near area or in a distant area relative to the vehicle door. In general, for example, the opening (or closing) of a tailgate or a vehicle side door can be effected by a user acting on a handle or tip switch on the tailgate or vehicle side door directly in the region of the tailgate or vehicle side door, or carries out a proper gesture in the region of the tailgate or vehicle side door. In this case, the user is in close proximity to the vehicle door, which might lead to the fact that for example during an opening operation (but possibly also during a closing operation), the user is present in the adjustment path of the vehicle door. When the user is recognized as an obstacle, this would possibly prevent an adjusting operation of the vehicle door, which is not wanted.

The control device is designed to distinguish for collision protection monitoring whether or not an operating command originates from the near area of the vehicle door. When an operating command is received via an operating device in the near area of the vehicle door, a first recognition area will be used for collision protection monitoring in a first operating mode so that an object detected by the sensor device in the first recognition area is recognized as a collision obstacle. The first recognition region for example can be designed in such a way that an area in which the user usually is present in order to act on an operating device in the region of the vehicle door, is excluded from the recognition area so that the user is not recognized as an obstacle.

When a user is present in the near area of the vehicle door when operating the vehicle door, it may be assumed that the user will automatically react to the adjusting movement of the vehicle door, for example by moving away from the adjustment area of the vehicle door in an appropriate way after actuation. When operating the vehicle door in the near region, the user will therefore not be recognized as an obstacle and will not prevent an adjustment of the vehicle door, for example to open the vehicle door.

The operating device, via which a user in the near area of the vehicle door can effect an operating command for adjusting the vehicle door, for example can be a handle or a tip switch on the vehicle door, a gesture recognition device or also a remote control. A handle or tip switch can be arranged directly on the vehicle door so that, when the handle or tip switch is actuated on the vehicle door, it is to be assumed that the user is present in close proximity to the vehicle door and thus in the near area of the vehicle door. A gesture recognition device usually requires that a user carries out a gesture, for example a kicking gesture or the like, directly in the region of the vehicle door, so that in this case, too, the user is present in the region of the vehicle door. It can also be recognized whether upon operation of the vehicle door by a remote control the user is present in a defined proximity to the vehicle door, for example by a local evaluation of the operating signals received via the remote control and by a localization of the remote control relative to the vehicle.

A gesture detection for recognizing and receiving an operating command in close proximity to the vehicle door possibly can also be carried out by the sensor device which is used for collision protection monitoring.

The near area can be defined and predetermined for example with reference to the space swept over by the vehicle door during an adjustment, possibly perpendicularly projected onto the ground.

On the other hand, when an operating command is not received from the near area, it can be inferred that the user is present in close proximity to the vehicle door and thus the vehicle door can unimpededly be adjusted by the user, for example for opening purposes. Hence it follows that an object which is arranged in the region of the vehicle door represents a collision obstacle and should correspondingly be recognized in connection with the collision protection monitoring. Correspondingly, a second, larger recognition area is used in a second operating mode so that an object detected by the sensor device in the second recognition area is recognized as a collision obstacle. An operation in the distant area for example can be effected by opening the vehicle door via an operating device in the vehicle interior space, for example via a switch or the like. An operation in the distant area can also be effected via a remote control in the distant area, i.e. outside the near area.

The first recognition area for example can be a subsection of the second recognition area. The second recognition area thus is larger than the first recognition area. The second recognition area for example can correspond to the entire detection range in which the sensor device can detect signals for detecting an object. The first detection range on the other hand excludes those areas in which a user usually is present in the near area to operate the vehicle door, so that a recognition of an object for the purpose of collision protection monitoring is carried out only in such an area in which a user usually is not present when operating in the near area.

Such a collision protection monitoring by using different operating modes with different recognition areas can be carried out for example when opening the vehicle door, for example when opening a tailgate or a vehicle side door, but possibly also when opening a cover of a loading area or an engine hood. However, this is not limiting. Such a collision protection monitoring by using different operating modes with different recognition areas can also be carried out when closing the vehicle door.

In one embodiment, the sensor device is configured to generate a location information on a detected object. With reference to the location information it can thus be recognized whether the object is present in the first recognition area, when collision protection monitoring in the first operating mode is carried out merely in the first recognition area. With reference to the location information generated by the sensor device it can thus be distinguished whether the object is present in the first recognition area or outside the first recognition area so that depending on this, the object can or cannot be classified as a potential collision object. With reference to the location information it can also be recognized in the second operating mode whether the object is present in the second recognition area, in order to carry out a collision protection monitoring in the second recognition area.

With reference to the location information, a control of the vehicle door can also be carried out. With reference to the localization of the object, an adjusting operation can be controlled in such a way that on opening or closing the vehicle door can be approached to the object, but an adjusting operation is stopped before the object is touched. With reference to a localized object in the first recognition area or in the second recognition area, an adjustment path for the vehicle door can thus be limited.

The sensor device for example can be a radar sensor, an ultrasonic sensor or a TOF camera device. A radar sensor, an ultrasonic sensor or a TOF camera device provide for a localization of an object in a three-dimensional space. A TOF camera device is a 3D camera system which measures distances by the so-called runtime method (TOF=Time of Flight).

A vehicle door, for example a tailgate and a vehicle side door, can have a window pane, for example. The sensor device here for example can be arranged on the inside of the window pane of the vehicle door so that the sensor device is concealed towards the outside by the window pane and for example is not visible from outside due to a suitable tint of the window pane.

The sensor device for example can be arranged centrally on the window pane, for example in the region of a foot of a wiper arranged on the window pane (for example on a tailgate).

The sensor device can be integrated into the foot of the wiper.

Alternatively, the sensor device for example can also be arranged in another portion, for example a frame portion or a spoiler arranged on the vehicle door, or the like.

In one embodiment, the first recognition area is designed such that an area above the vehicle door is monitored. The area above the vehicle door for example can be defined by a boundary which points upwards from an edge of the vehicle door along a perpendicular spatial direction (and the perpendicular spatial direction for example can point along a direction of gravity). Due to the fact that only an area above the vehicle door is monitored for example on opening, those areas in which a user is present when operating in the near area, are excluded from the collision protection monitoring so that a user is falsely recognized as an obstacle.

The recognition area defined by a suitable boundary can be fixed and unchangeable, and may be independent of the adjusting movement of the vehicle door.

Alternatively, however, it is also conceivable to adapt the first recognition area in dependence for example on the adjustment position of the vehicle door so that always an area above the vehicle door is monitored for the purpose of collision protection monitoring. A boundary of the first recognition area thus may be adapted when the vehicle door is adjusted, so that proceeding for example from a fixed or variable location on the vehicle door it always points perpendicularly upwards and thus changes its orientation relative to the vehicle door.

In addition or alternatively, the first operating mode for example may be terminated in a time-dependent way. For example, it is possible to switch from the first operating mode to the second operating mode after a predetermined time in order to carry out a complete collision monitoring in the (larger) second recognition area. This is effected against the background that it is to be assumed that the user operating the vehicle door in the near area automatically moves away from the near area after the operation has been effected so that after a certain period a collision protection monitoring should be carried out in a larger recognition area.

In addition or alternatively, it is possible to switch from the first operating mode to the second operating mode when a change in position of the user is detected. For example, when it is recognized by localizing the remote control of the user that the user has moved from the near area into the distant area, for example in that the user has stepped out of the near area of a tailgate, it is possible to switch from the first operating mode to the second operating mode in order to carry out a collision protection monitoring in a larger recognition area in the case of a further adjustment.

In dependence on a recognized collision obstacle an adjusting operation of the vehicle door may be controlled. For example, when recognizing a collision obstacle, an adjustment of the vehicle door may be controlled in such a way that the adjustment path is limited in dependence on the location of the collision obstacle. Thus, the control can be effected in such a way that when the vehicle door is adjusted, the vehicle door is moved only to such an extent that it does not get in contact with the collision obstacle.

In one embodiment, the control device is configured to determine a projection of the collision obstacle and to limit the adjustment path in dependence on the projection.

The sensor device usually has a blind area in which no collision protection monitoring can be carried out. When an object is detected in a recognition area just used, it can possibly be assumed that the object extends into the blind area of the sensor device so that a localization of the object in the recognition area possibly is insufficient for a suitable control of the adjusting movement of the vehicle door. In order to estimate whether a risk of collision possibly also exists in the blind area, a projection therefore is determined in dependence on a localization of the object in the recognition area in order to limit the adjustment path of the vehicle door in dependence on the projection determined in this way.

For determining the projection, a location of the collision obstacle for example can be projected along a predetermined spatial direction, for example along a perpendicular spatial direction corresponding to the direction of gravity. This is effected against the background that objects frequently are extended perpendicularly from the ground, for example from a wall, a tree or a sign, so that it can be assumed that an object localized in a recognition area possibly extends perpendicularly downwards into a blind area of the sensor device. The projection of the object along the predetermined spatial direction is identified as a collision area, i.e. as an area in which there possibly is a risk of collision when the vehicle door is moved into this area. Correspondingly, the movement of the vehicle door can be adapted so that the vehicle door is not moved into the collision area.

A limitation of the adjustment path by calculating the projection here—in one embodiment—for example is effected only in the second operating mode, hence during an operation out of the distant area.

The object also is achieved by a method for adjusting a vehicle door relative to a vehicle body. In the method, an electromotive adjusting device is controlled by a control device, and the control device receives an operating command and controls the adjusting device in dependence on the receipt of an operating command to adjust the vehicle door. An object is detected by a sensor device. It is provided that the control device evaluates whether an operating command is received via an operating device in a near area relative to the vehicle door. In a first operating mode, the control device uses a first recognition area in the case of an operating command received by an operating device in the near area in order to recognize an object detected by the sensor device in the first recognition area as a collision obstacle. In the case of an operating command not received in the near area, the control device in a second operating mode on the other hand uses a second recognition area different from the first recognition area in order to recognize an object detected by the sensor device in the second recognition area as a collision obstacle.

The advantages and advantageous embodiments described above for the system analogously are also applicable to the method so that in this respect reference is made to the preceding explanations.

BRIEF DESCRIPTION OF THE DRAWINGS

The idea underlying the invention will be explained in detail below with reference to the exemplary embodiments illustrated in the Figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system for adjusting a vehicle door may provide for collision protection monitoring in the event of an automatic adjustment of the vehicle door. Within the scope of such a collision protection monitoring, it will be determined whether on opening, for example, the vehicle door possibly collides with an object, in order to control the adjusting movement of the vehicle door in dependence on such a collision risk. A collision protection monitoring will preferably be carried out in such a way that the presence of an object in an adjustment path of the vehicle door is detected already at an early stage before the vehicle door touches the object, in order to thereby exclude any danger to the object and damage to the vehicle door.

However, it should be avoided as far as possible that objects are falsely recognized as obstacles. For example, when a user acts on a handle or tip switch on a tailgate to thereby open the tailgate, the user is present in the adjustment path of the tailgate, which can falsely be recognized as an obstacle by a collision protection monitoring system and can lead to an opening operation being prevented. This is to be avoided as far as possible.

In an adjustment system known from DE 10 2012 014 243 B4 for the automatic movement of a vehicle wing, in particular a tailgate, an evaluation and control unit is provided, which is configured to perform a prioritization of operating points in order to assign a higher priority for the operation of the vehicle wing to a first operating point as compared to a second operating point.

From EP 1 407 106 B2 a method for opening and closing a part rotatably or tiltably mounted on a vehicle is known, and on adjustment of the part by means of an adjusting motor, parameters representative of an adjustment force of the part are detected and evaluated for an obstacle detection.

Figure 1:
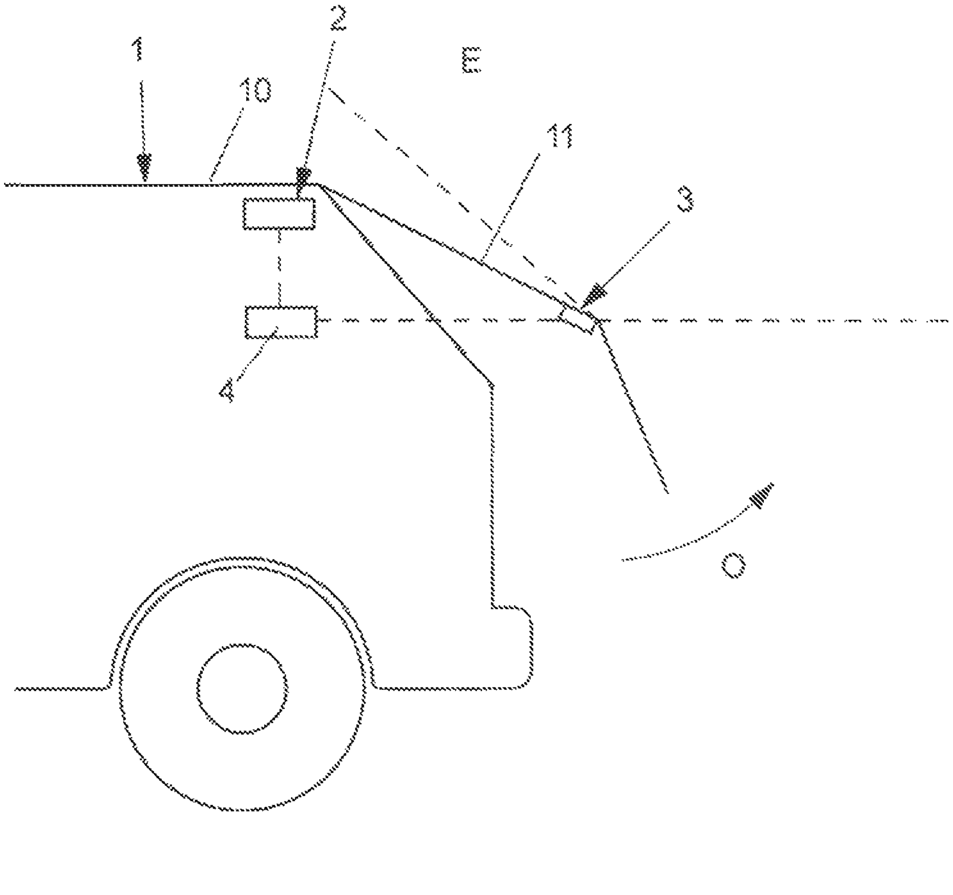
FIG. 1 shows a schematic view of a vehicle with a vehicle door arranged on a vehicle body.

FIG. 1 shows a schematic view of a vehicle 1 which includes a vehicle door 11 pivotally arranged relative to a vehicle body 10 in the form of a tailgate arranged at the rear of the vehicle 1.

In the system shown in FIG. 1, the vehicle door 11 can be adjusted relative to the vehicle body 10 via an electromotive adjusting device 2, for example in the form of a spindle drive or the like, in order to bring the vehicle door 11 from a closed position into an open position along an opening direction O or, vice versa, to close the vehicle door 11 against the opening direction O out of an open position.

A control device 4 serves for controlling the adjusting device 2.

Signals can be detected via a sensor device 3 in order to carry out a collision protection monitoring in a recognition area E on the vehicle door 11 and, when the vehicle door 11 is adjusted, to prevent the vehicle door 11 from getting in contact with an object in the adjustment path of the vehicle door 11 so as to exclude a danger to the object and a damage at the vehicle door 11.

Figure 2:
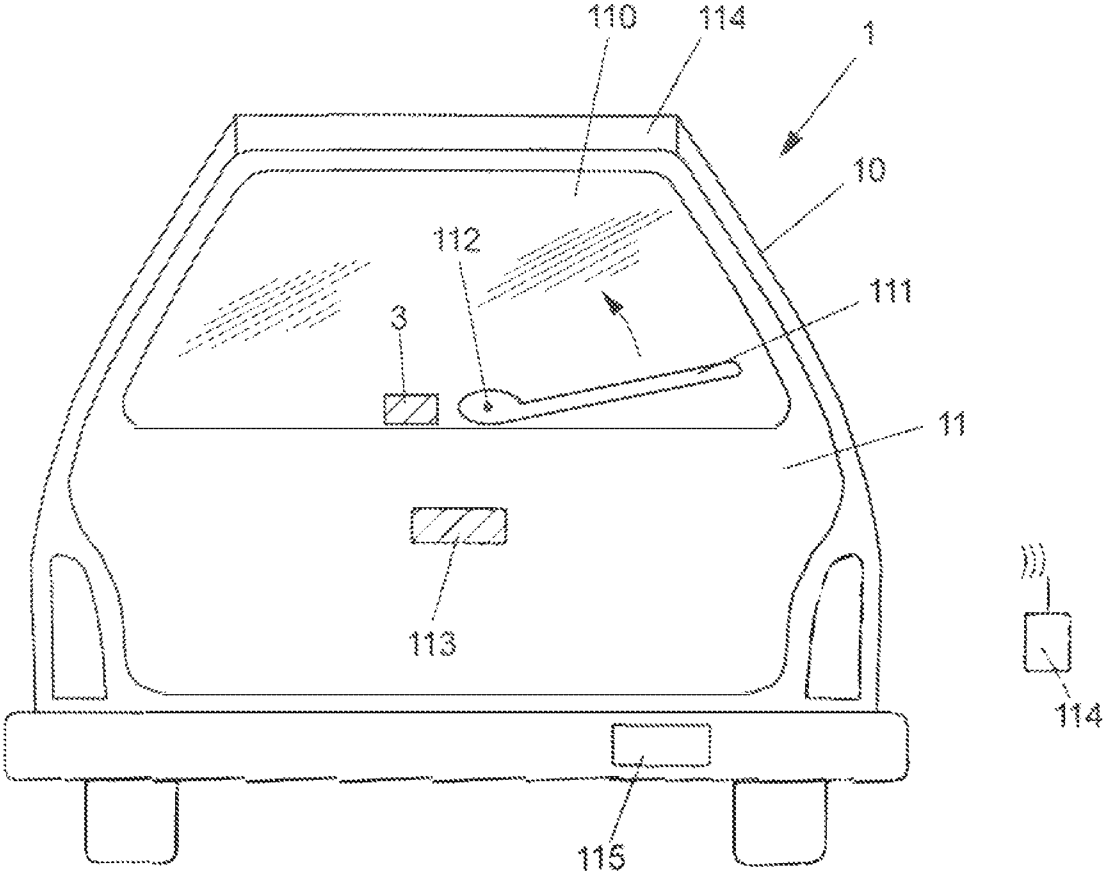
FIG. 2 shows a schematic rear view of the vehicle.

As can be taken from the rear view of the vehicle 1 as shown in FIG. 2, the sensor device 3 can be arranged for example on the inside of a window pane 110 of the vehicle door 11 and for example be located approximately centrally in the region of a foot 112 of a wiper 111 of the vehicle door 11.

It is also conceivable to integrate the sensor device 3 into the foot 112 of the wiper 111.

An operation of the vehicle door 11 for example for opening purposes can be effected by different operating devices 113, 114, 115.

A user for example can touch a handle or tip switch 113 of the vehicle door 11 so as to generate an operating command and bring the vehicle door 11 for example from a closed position into an open position, and the operation of the handle or tip switch 113 generates an operating command and the adjusting device 2 is actuated via the control device 4 for the electromotive, automatic adjustment of the vehicle door 11.

Alternatively, a user can generate an operating command via a remote control 114, which leads to an adjustment of the vehicle door 11, for example to an opening of the vehicle door 11.

Again as an alternative, a user can carry out a gesture, for example in the form of a kicking gesture, which can be recognized via a gesture recognition device 115 and leads to an adjustment of the vehicle door 11, for example to an opening.

A gesture detection for example can also be carried out via the sensor device 3, which serves for collision protection monitoring.

Figure 3:
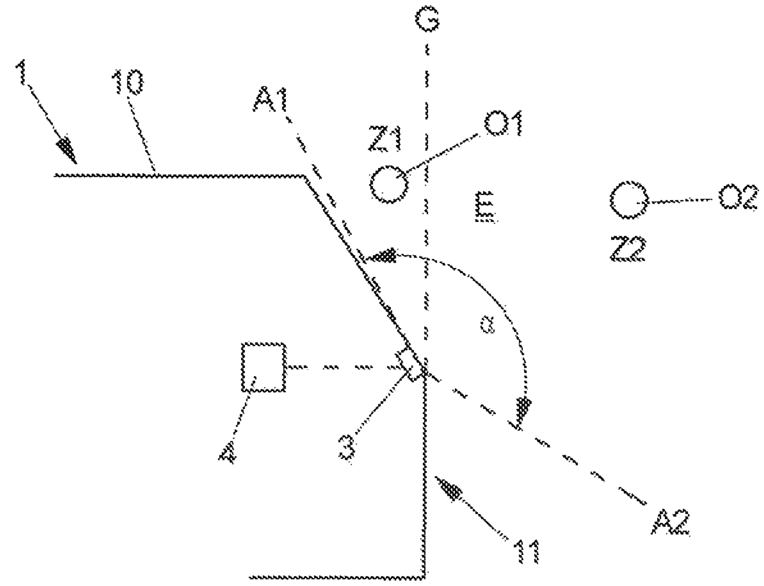
FIG. 3 shows a schematic view of the vehicle, representing a recognition area of a sensor device for recognizing a collision obstacle.
Figure 4:
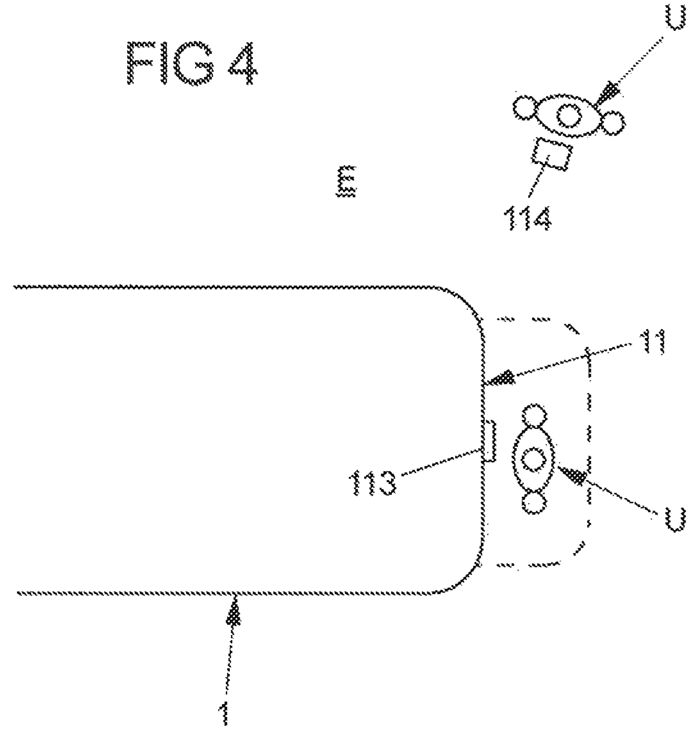
FIG. 4 shows a schematic top view of the vehicle, comprising a near area in the region of the vehicle door.

With reference to FIGS. 3 and 4, an operating command generally can be triggered by a user U in different spatial areas of a vehicle.

For example, a user U can be present in a near area N directly at the vehicle door 11 in order to act on the handle or tip switch 113 or carry out a gesture on the gesture recognition device 115, as this can be taken from FIG. 4. A user U in the near area N likewise can operate a remote control 114.

However, a user U also can be present in a distant area F outside the near area N, when for example triggering an operating command for adjusting the vehicle door 11 via a remote control 114. In this case, the user U thus is not present in close proximity to the vehicle door 11, but is away from the vehicle door 11. The user U for example is also present in such a distant area F when he is present in the vehicle interior space and effects an adjustment of the vehicle door 11 by a suitable actuating device in the vehicle interior space.

Depending on whether the user U is present in the near area N or outside the near area N when operating the vehicle door 11, a collision protection monitoring for adjusting the vehicle door can be effected in different ways.

As shown in FIG. 3, the sensor device 3, which for example is realized by a radar sensor, an ultrasonic sensor or a TOF camera device, is designed to generate sensor signals such as for the spatial localization of objects O1, O2 in a recognition area E. The recognition area E here (in the sectional plane shown in FIG. 3, which is defined by the vehicle longitudinal direction and the vehicle vertical direction) extends over an angle $\alpha$ between detection boundaries A1, A2. By measuring the distance, the sensor device 3 can determine where a respective object O1, O2 is located in the recognition area E.

For example, when opening the vehicle door 11, a user U performing an operation of the vehicle door 11 from the near area N should not be recognized as a collision obstacle in order to prevent that due to the presence of the user U an adjustment of the vehicle door 11 is prevented. This proceeds from the fact that the user U must be present in the near area N in order to for example act on the handle or tip switch 113 or to carry out a gesture in the region of the gesture recognition device 115. The user U, however, usually will automatically step out of the near area N when the vehicle door 11 opens in response to such an operation.

To prevent that the presence of the user U prevents an opening of the vehicle door 11, a collision protection monitoring is carried out in different ways depending on the spatial origin of an operating command.

For the purpose of collision protection monitoring, the control device 4 uses a first recognition area Z1, which corresponds to a sub-section of the recognition area E and is defined by a boundary G, when an operating command is triggered by a user U in the near area N, for example in that the operating command is received via the handle or tip switch 113, a remote control 114 in the near area N, or the gesture recognition device 115. In such a first operating mode, collision protection monitoring thus is carried out only in an area above the vehicle door 11, but not in an area in which a user U is present at the vehicle door 11.

On the other hand, when an operating command is not received in the near area N, but from the distant area F, the control device 4 in a second operating mode uses a second recognition area E for the purpose of collision protection monitoring, so that in the second operating mode a recognition is carried out in the area Z2 and thus in the entire detection range of the sensor device 3 in addition to a recognition in the area Z1.

Thus, in the first operating mode an object O1 in the area Z1 is recognized as a collision obstacle, whereas an object O2 outside the area Z1 is not recognized as a collision obstacle. In the second operating mode, on the other hand, both objects O1, O2 are recognized as collision obstacles.

In dependence on the recognition of a collision obstacle the adjusting operation then can be controlled in such a way that the vehicle door 11 for example is not opened at all or is only opened to such an extent that the vehicle door 11 does not abut against the object O1, O2, but is stopped before.

The recognition areas Z1, Z2 may be firmly defined and may be unchangeable.

Figure 5:
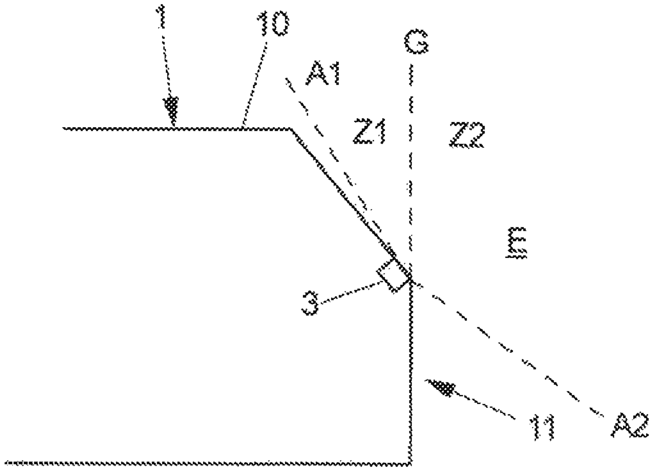
FIG. 5 shows another schematic view of the vehicle, comprising a recognition area for the purpose of collision protection monitoring.
Figure 6:
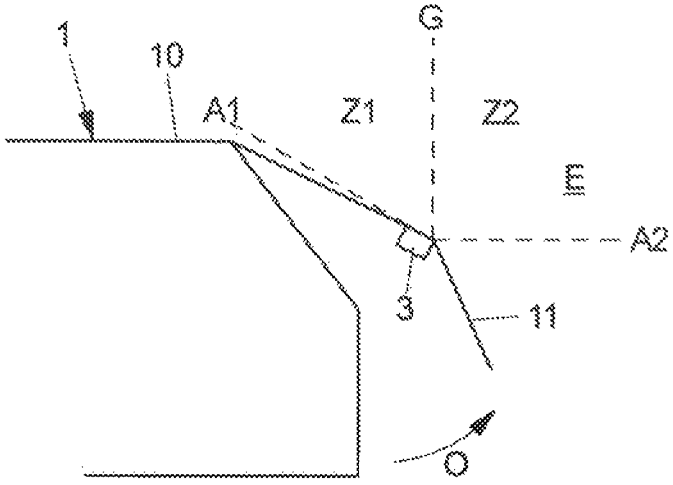
FIG. 6 shows a schematic view of the vehicle, with a partly open vehicle door and an adapted recognition area.

Alternatively, the recognition area Z1 can also be variable, however, in the first operating mode, for example in dependence on the position of the vehicle door 11 just taken for example on opening, as this is shown in FIGS. 5 and 6. The boundary G of the recognition area Z1 thus can be adapted in dependence on the adjustment position of the vehicle door 11 such that the boundary G always points perpendicularly upwards from a defined, possibly also variable location at the vehicle door 11 so that an area above the vehicle door 11 is always monitored, as is shown at the transition from FIG. 5 towards FIG. 6.

The recognition area E in the second operating mode remains unchangeable, and merely the ratio between the first recognition area Z1 and the second recognition area E (corresponding to the combination of the areas Z1, Z2) is changed.

In addition or alternatively, it can be provided to switch from the first operating mode to the second operating mode for example after a predetermined time, while the vehicle door 11 is moved. This is effected against the background that it can be assumed that a user will automatically step out of the adjustment range of the vehicle door 11 after the operation via an operating device 113, 114, 115 has been effected, so that after a certain period a complete collision protection monitoring can be performed in the entire recognition area E and thus one should switch to the second operating mode.

Again in addition or alternatively, one can also switch from the first operating mode to the second operating mode, for example when it is detected by means of a localization of a remote control 114 that a user changes his position relative to the vehicle 1, for example in that a user steps out of the near area N and thus no longer is present in proximity to the vehicle door 11.

Figure 7:
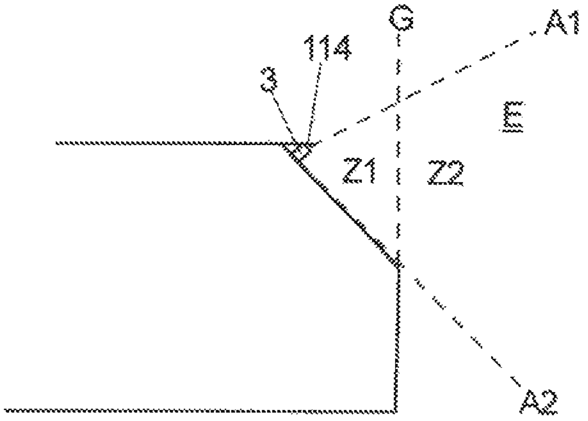
FIG. 7 shows a schematic view of a vehicle, with another embodiment of a sensor device.

In the examples shown in FIGS. 1 to 6 the sensor device 3 is arranged in the region of the lower edge of a window pane 110 of the vehicle door 11, as this can be taken for example from FIG. 2. However, this is by no means limiting. In principle, the sensor device 3 can be arranged at any place on the vehicle door 11, for example in the region of a spoiler 116 at an upper edge of the vehicle door 11, as this can be taken from FIG. 7. Although the detection range of the sensor device 3 is not influenced thereby, the mode of operation is not changed by another positioning of the sensor device 3.

In dependence on the recognition of an object O1, O2 as a collision obstacle, the control of the adjusting movement of the vehicle door 11 by the control device 4 will be influenced. Upon recognition of a collision obstacle, an adjusting operation of the vehicle door 11 can be prevented completely or, alternatively, an adjusting operation can be limited such that the vehicle door 11 is moved, but is approached to an obstacle only to such an extent that the vehicle door 11 does not get in contact with the obstacle.

Figure 8:
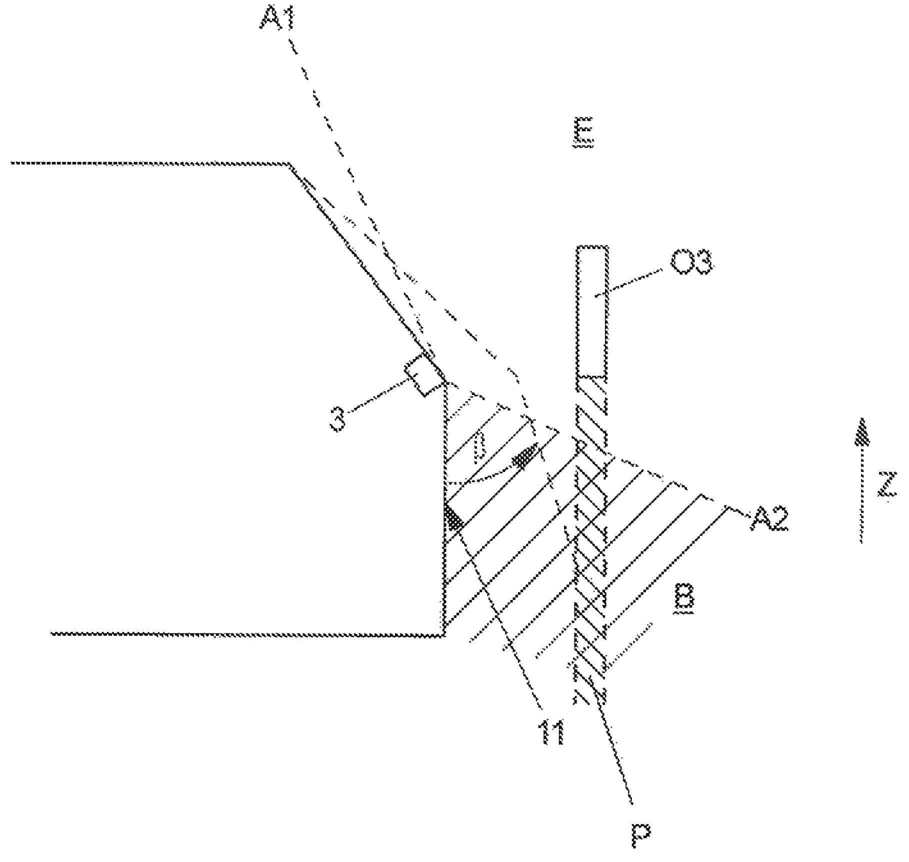
FIG. 8 shows a schematic view of a vehicle, representing a limited adjustment path of the vehicle door, which is determined in dependence on a projection of a collision obstacle.

As shown in FIG. 8, an object O3 for example can be recognized in a recognition area E of the sensor device 3 and be classified as a collision obstacle, and the sensor device 3 is designed to generate a location information for the object O3 and thus to localize the object O3. To determine an adjustment path corresponding to an adjustment angle β, which is dimensioned such that the vehicle door 11 is moved, but does not get in contact with the obstacle, a projection P is calculated for the object O3 in the exemplary embodiment shown in FIG. 8, in which the object O3 is projected downwards along a perpendicular spatial direction Z corresponding to the direction of gravity. As a result, the object O3 localized by the sensor device 3 is projected into a blind area B beyond a detection limit A2 of the sensor device 3, and the area of the projection P is assumed as a collision area and the adjustment path is calculated such that the vehicle door 11 is not moved into the area of the projection P.

This proceeds from the fact that objects for example in the form of trees, signs or walls usually are arranged on the ground and extend (approximately) perpendicularly from the ground. Thus, there is a (not low) probability for the fact that an object O3 localized in the recognition area E extends perpendicularly downwards also into a blind area B of the sensor device 3, which should be considered correspondingly in the control of the adjusting operation of the vehicle door 11.

The idea underlying the invention is not limited to the exemplary embodiments described above, but can also be realized in a different way.

The vehicle door can be a tailgate, a vehicle side door, an engine hood, a cover of a storage area (for example in a pick-up truck) or the like. Such a vehicle door can be pivotally, but possibly also shiftably arranged on a vehicle body.

Figure 9:
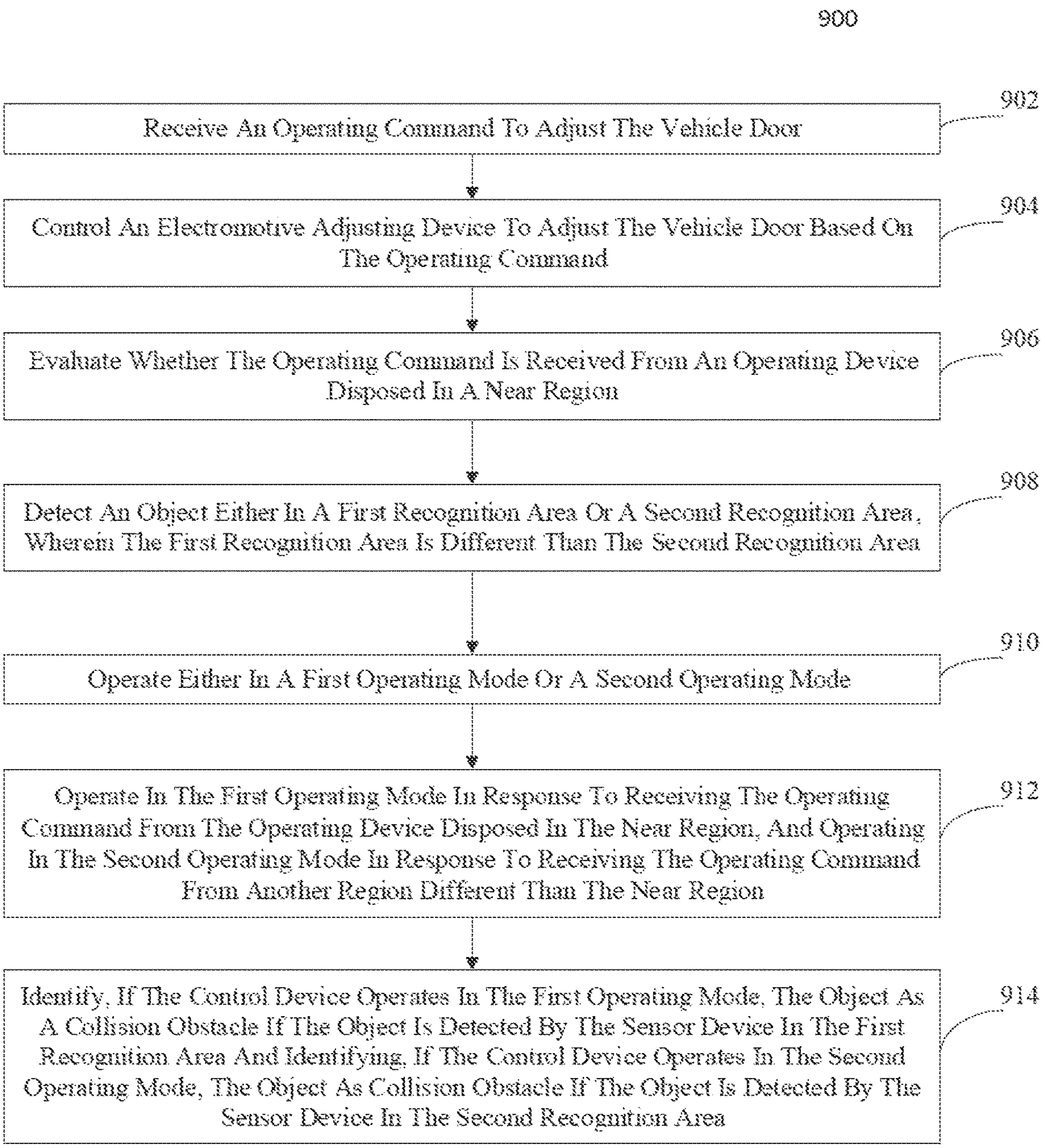
FIG. 9 shows a flowchart illustrating an example embodiment for adjusting a vehicle door relative to a vehicle body which may provide for a reliable obstacle detection for the purpose of collision protection monitoring.

FIG. 9 is a flowchart of an example process 900 for adjusting a vehicle door relative to a vehicle body which may provide for a reliable obstacle detection for the purpose of collision protection monitoring. In some implementations, one or more process blocks of FIG. 9 may be performed by the control device 4.

As shown in FIG. 9, process 900 may include receiving an operating command to adjust the vehicle door 11 (block 902). For example, the control device 4 may receive an operating command to adjust the vehicle door 11, as described above.

As also shown in FIG. 9, process 900 may include controlling the electromotive adjusting device 2 to adjust the vehicle door 11 based on the operating command (block 904). For example, the control device 4 may control the electromotive adjusting device 2 to adjust the vehicle door 11 based on the operating command, as described above.

As further shown in FIG. 9, process 900 may include evaluating whether the operating command is received from an operating device 113, 114, 115 disposed in a near region (block 906). For example, control device 2 may evaluate whether the operating command is received from an operating device 113, 114, 115 disposed in a near region, as described above.

As also shown in FIG. 9, process 900 may include detecting an object either in a first recognition area or a second recognition area, where the first recognition area is different than the second recognition area (block 908). For example, the sensor device 3 may detect the object either in the first recognition area or the second recognition area, as described above.

As further shown in FIG. 9, process 900 may include operating either in a first operating mode or a second operating mode (block 910). For example, the control device 4 may operate either in a first operating mode or a second operating mode, as described above.

As also shown in FIG. 9, process 900 may include operating in the first operating mode in response to receiving the operating command from the operating device 113, 114, 115 disposed in the near region, and operating in the second operating mode in response to receiving the operating command from another region different than the near region, (block 912). For example, the control device 4 may operate in the first operating mode in response to receiving the operating command from the operating device 113, 114, 115 disposed in the near region, and operating in the second operating mode in response to receiving the operating command from another region different than the near region, as described above.

As further shown in FIG. 9, process 900 may include identifying, if the control device 4 operates in the first operating mode, the object as a collision obstacle if the object is detected by the sensor device 3 in the first recognition area, and identifying, if the control device 4 operates in the second operating mode, the object as collision obstacle if the object is detected by the sensor device 3 in the second recognition area (block 914).

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

LIST OF REFERENCE NUMERALS

1 vehicle
10 vehicle body
11 vehicle door (tailgate)
110 window pane
111 wiper
112 foot
113 operating device (handle)
114 operating device (remote control)
115 operating device (gesture recognition device)
116 spoiler
2 adjusting device
3 sensor device
4 control device
α, β angle
A1, A2 detection limit
B blind area
E recognition area
F distant area
N near area
O opening direction
O1, O2, O3 object
P projection
U user
Z spatial direction
Z1, Z2 recognition area While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of adjusting a vehicle door relative to a vehicle body, the method comprising:

receiving, by a control device, an operating command from a control device to adjust the vehicle door;

controlling, by the control device, an electromotive adjusting device to adjust the vehicle door based on the operating command;

evaluating, by the control device, whether the operating command is received from a near area;

detecting an object by a sensor device;

detecting, by a sensor, an object disposed either in a first recognition area or a second recognition area; and operating, by the control device, either in a first operating mode or a second operating mode, wherein the operating step includes operating in the first operating mode in response to receiving the operating command from the near area, and operating in the second operating mode in response to receiving the operating command from another area different than the near area, and wherein the operating step includes recognizing, by the control device operating in the first operating mode, the object disposed in the first recognition area a collision obstacle, or recognizing, by the control device operating in the second operating mode, the object disposed the second recognition area as the collision obstacle.

2. The method of claim 1, further comprising:

altering the first recognition area as the vehicle door is adjusted.

3. The method of claim 2, further comprising:

stopping the adjustment of the vehicle door in response to recognizing the collision obstacle.

4. The method of claim 3, further comprising:

projecting a projection extending along a predetermined spatial direction from the object.

* * * * *